US012802364B2

(12) United States Patent
Johnston et al.

(10) Patent No.: US 12,802,364 B2
(45) Date of Patent: Nov. 17, 2026

(54) ROTATIONAL DEVICE FOR AN AUGMENTED REALITY DISPLAY SURFACE USING NFC TECHNOLOGY

(71) Applicants: Aaron Michael Johnston, Santa Fe, NM (US); Louis Anthony Romero, Albuquerque, NM (US)

(72) Inventors: Aaron Michael Johnston, Santa Fe, NM (US); Louis Anthony Romero, Albuquerque, NM (US)

( * ) Notice: Subject to any disclaimer, the term of this patent is extended or adjusted under 35 U.S.C. 154(b) by 839 days.

(21) Appl. No.: 17/972,278

(22) Filed: Oct. 24, 2022

(65) Prior Publication Data

US 2023/0050375 A1 Feb. 16, 2023

Related U.S. Application Data

(63) Continuation-in-part of application No. 17/837,000, filed on Jun. 9, 2022, now Pat. No. 11,527,050, which is a continuation-in-part of application No. 17/189,216, filed on Mar. 1, 2021, now Pat. No. 11,385,762.

(60) Provisional application No. 62/982,299, filed on Feb. 27, 2020.

(51) Int. Cl.

| | |
|---|---|
| ***G06T 19/20*** | (2011.01) |
| ***G06T 19/00*** | (2011.01) |
| ***H04W 4/80*** | (2018.01) |

(52) U.S. Cl.
CPC ............ *G06T 19/006* (2013.01); *G06T 19/20* (2013.01); *H04W 4/80* (2018.02)

(58) Field of Classification Search
CPC .............................. G06T 19/006; G06T 19/20
USPC ......................................................... 345/419
See application file for complete search history.

(56) References Cited

U.S. PATENT DOCUMENTS

| | | | | |
|---|---|---|---|---|
| 2015/0332031 | A1* | 11/2015 | Mistry | H04W 12/06 726/19 |
| 2017/0078447 | A1* | 3/2017 | Hancock | H04N 21/4424 |
| 2017/0270198 | A1* | 9/2017 | Sample | G06F 16/211 |

* cited by examiner

*Primary Examiner* — Nguyen T Truong

(57) ABSTRACT

A device for displaying AR markings comprising a top and a base, with the top rotatably attached to the base, and the base configured to be held by a hand or placed on a fixed surface. The AR markings are positioned on the top such that when the top rotates with respect to the base, so do the AR markings. When the AR markings are scanned by an appropriate scanning and display device, such as a smart phone, a 3d image associated with the AR markings will be displayed on the display device as an augmented reality projection. When the top rotates with respect to the base, so too does the augmented reality projection.

16 Claims, 15 Drawing Sheets

ROTATIONAL DEVICE FOR AN AUGMENTED REALITY DISPLAY SURFACE USING NFC TECHNOLOGY

PRIORITY CLAIM

This application claims the benefit of and priority to U.S. Provisional Application Ser. No. 62/982,299, filed Feb. 27, 2020, U.S. Non-Provisional application Ser. No. 17/189,216, filed Mar. 1, 2021, and U.S. Non-Provisional application Ser. No. 17/837,000, filed Jun. 9, 2022. The above referenced applications are incorporated in their entirety as if restated in full.

BACKGROUND

Augmented reality (AR) is an emerging technology in which computer-generated sensory simulations of virtual reality (VR) are applied to or otherwise integrated with the sensory simulations of the real world. One advantage of augmented reality over purely virtual reality, is that augmented reality may build upon a real world experience, which is not only, inherently, more realistic, but often perceived as more important, while simultaneously providing a virtual layer which may provide fantastic or imaginary material for entertainment or contextual information to explain or describe the real world. However, while the real world and virtual worlds may each be self-contained, with the former not requiring the latter and the latter only requiring the former to the degree that hardware is necessary for an individual to enter and experience the virtual world, augmented reality requires another type of technology and methodology to enable a seamless integration between the real and virtual worlds.

In particular, the spatial aspects of the real and virtual worlds are difficult to reconcile. AR markings are used to fix a virtual experience, in particular its visual or graphical data points, to a real spatial position. By scanning the AR markings using some sort of scanning device, a user may perceive a purely virtual object on a display device. If the display device is equipped with a camera, the user may simultaneously view, on the display device, the visual material of the real world. In particular, the user may view the virtual object in the spatial context of the visual material of the real world. If the user scans the AR marker from a different position, the user may then view the virtual object from a different perspective, and may therefore view a different side of the object. However, unlike real objects, virtual objects projected via augmented reality into the real world cannot be lifted or otherwise manipulated. In this sense, the virtual object loses its degree of realism. Also, there are many instances in which an augmented reality experience may be desired, in particular a three dimensional and multi-perspective experience thereof, in which it is inconvenient to actually walk around the AR marker in order to scan it from different vantages.

Virtual objects can often be manipulated via controllers, such as gloves; however, these controllers are expensive, but even more problematically, they are inconvenient to carry (unlike a smart device). Also, they must often be calibrated prior to use, which may be a relatively trivial step in regard to purely virtual worlds, but is unrealistic in the context of augmented reality, in which an individual traverses the real world and cannot be expected to recalibrate a device every time an augmented reality experience is desired. What is needed is an apparatus that enables the virtual object to be manipulated without requiring more than the ubiquitous smart phone.

SUMMARY

This application described a device for enabling an augmented reality experience and for facilitating the rotation of the visual aspect of that augmented reality experience. The device may comprise a main body rotatably connected to a base. The main body is a physical framework for supporting AR surface via a top surface on which AR markers are mounted, displayed, or otherwise attached. The main body may be connected to the base by a rotational mechanism, such as an annular ring or a shaft. The base may rest upon a fixed surface, such as a table or pedestal, or it may be held by a user.

BRIEF DESCRIPTION OF THE DRAWINGS

FIG. 17*a* shows a first side view, FIG. 17*b* shows a second side view, and FIG. 17*c* shows a bottom view of the ring hingedly embedded in the niche. FIG. 17*d* shows a first side view, FIG. 17*e* shows a second side view, and FIG. 17*f* shows a bottom view of the ring folded outward from the niche. FIG. 17*g* shows a first side view, FIG. 17*h* shows a second side view.

FIG. 18*a* shows a side view of the device, FIG. 18*b* shows a bottom view of the device with the band embedded in the niche, and FIG. 18*c* shows a side view of the device with the band pulled away from the niche.

DETAILED DESCRIPTION

Figure 1A:
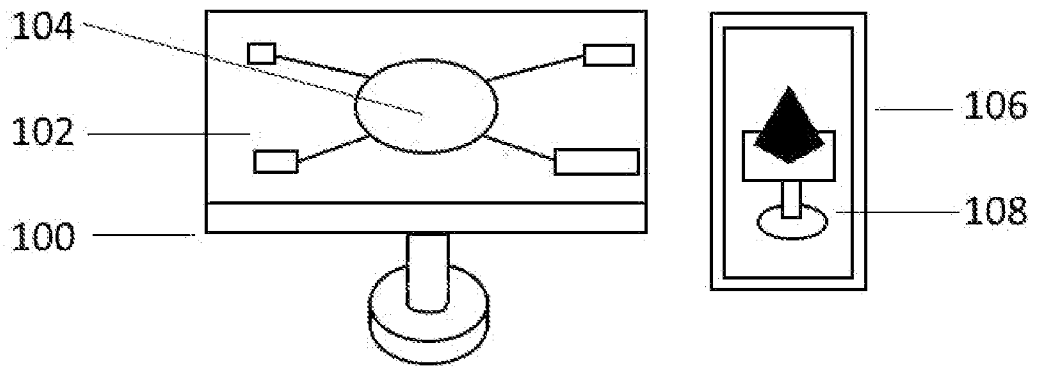
FIGS. 1*a-c* show views of an exemplary device.
Figure 1B:
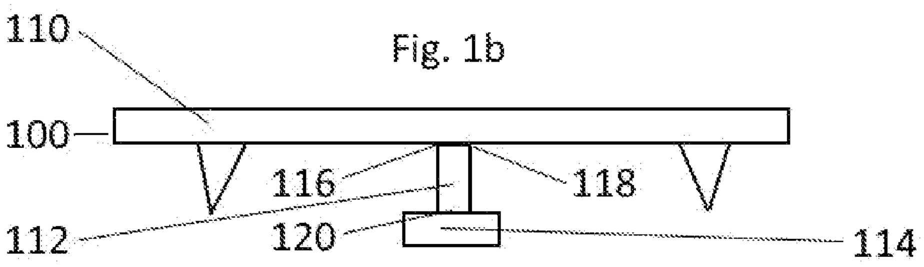
Figure 1C:
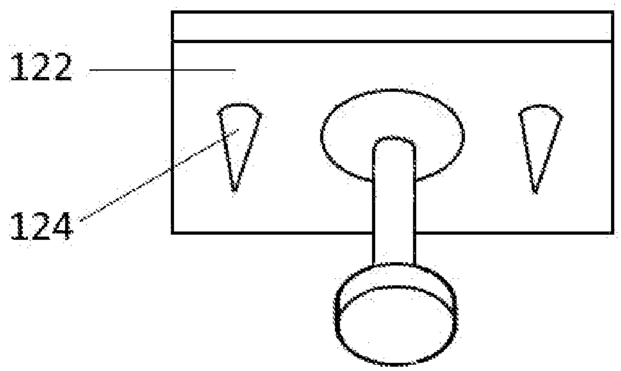
Figure 2A:
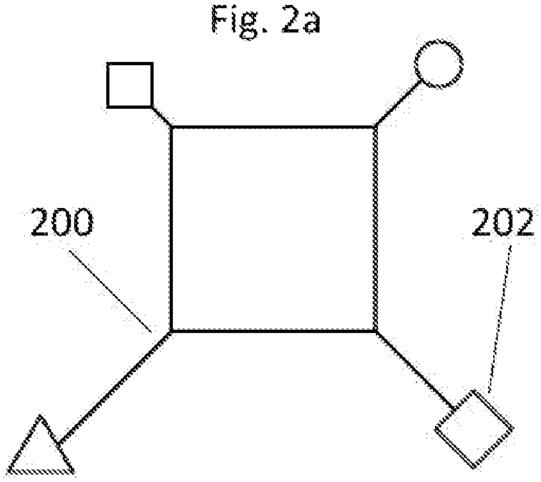
FIGS. 2*a-f* show exemplary AR markers.
Figure 2B:
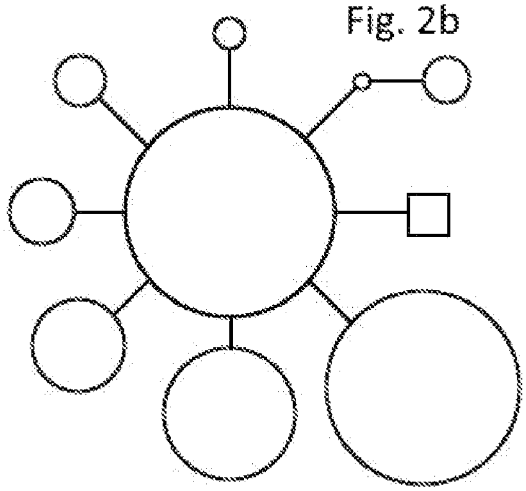
Figure 2C:
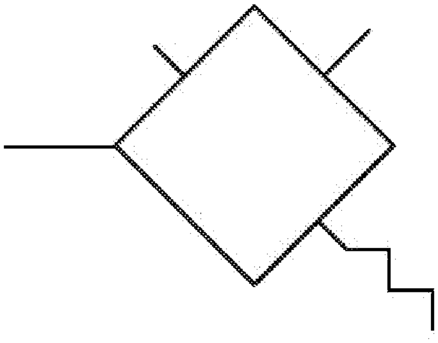
Figure 2D:
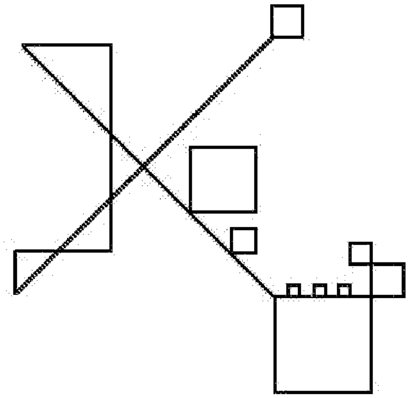
Figure 2E:
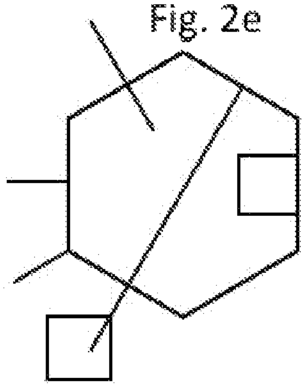
Figure 2F:
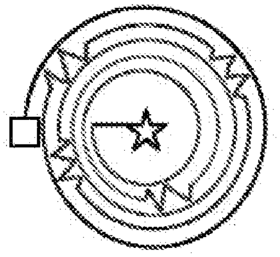
Figure 3A:
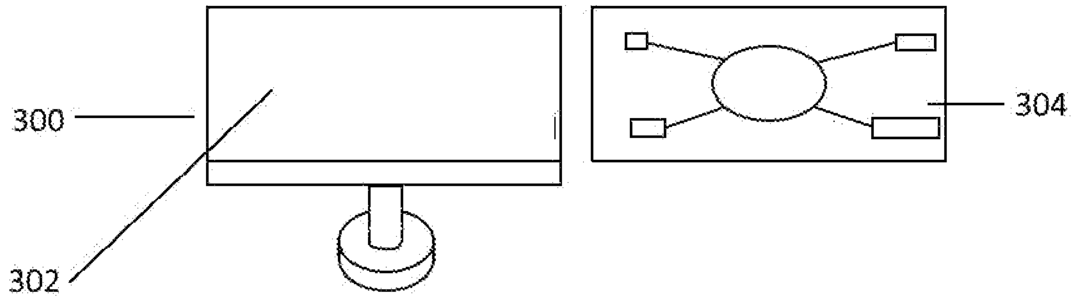
FIGS. 3*a-d* show an exemplary sleeve configuration for receiving an AR marker surface.
Figure 3B:
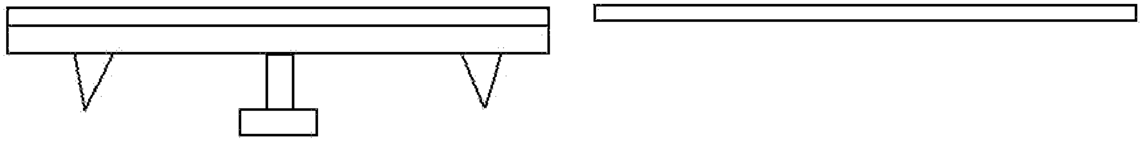
Figure 3C:
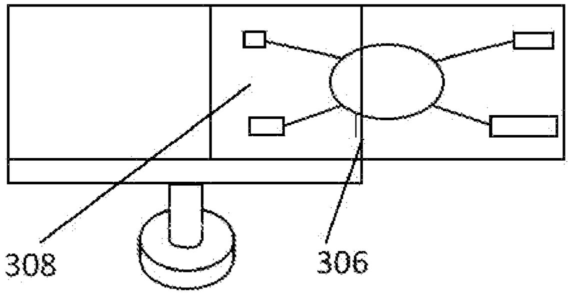
Figure 3D:
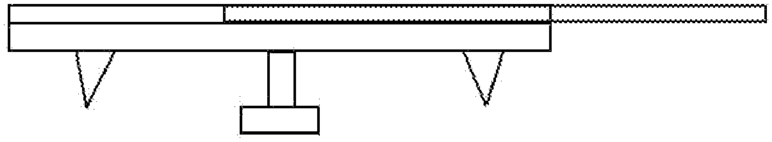

The present invention conceives a rotational body, or as shown in FIG. 1*a-c*, a main body 100 for an augmented reality display surface 102. The main body is ideally configured to be held in one hand, preferably between the thumb and index finger or thumb and middle finger. The augmented reality display surface may be flat or contoured, hinged and foldable or fixed, and may feature one or more markers 104 configured to be capturable by a scanning device 106, such as a camera, or any other device equipped with a camera or scanner. The scanning device may feature a monitor or display screen 108, may be concurrently connected or connectable to a monitor or display screen, or may be capable of transmitting graphic data to a monitor or display screen.

As shown in FIG. 2*a-f*, a marker 200 may comprise one or more lines 202 and shapes 204 of consistent or varying thickness, color, or texture. The marker is graphically displayed on the augmented reality display surface, and it may be printed on the surface, digitally displayed, or projected. The marker may be limited to the center of the display surface, be graphically bounded in the center, or be in contact with the edges. Multiple markers may graphically intersect, overlap, or be separated by white or neutral space. Markers may be distinguished by color, line thickness, texture, or placement.

In one embodiment, a plurality of markers are connected via one or more lines. Each marker may be positioned in a corner or circumferential position of the augmented reality display surface. The connecting lines may form their own shape, such as a circle, square, or other geometric, pictoral, or abstract shape. This shape may form an inner area of negative space in which no markings appear.

Data relating to the marker, together with the marker, may be saved to a database. The data may include digital media files of various formats, including fbx, dae, 3ds, dxf, obj, gITF, USDZ, skp, or any other 3d content file format. The media files may include textures, skins, and animations. The data may include models relating to three dimensional objects or surfaces onto which graphic display data will be projected, such as wire-frame, polygonal, or curve models.

This database may be saved locally on the scanning device or remotely on a separate system. Local access may include the storage of the database on the scanning device itself or on a separate device into which the scanning device may be plugged into, either directly via a port or by means of a cable. Remote access may include connecting the scanning device to the separate system by means of a wireless protocol, such as Bluetooth or WiFi.

Access to the database may be limited by various permissions that may be granted or denied by a system administrator or by the system directly. Access may be predicated on having an account, paying a one-time fee, subscribing, and/or the user being of sufficient age.

The main body provides a support for the augmented reality display surface. The display surface may be mounted, attached to, or otherwise integrated onto the main body. In one embodiment, the main body may be rigidly or rotationally fixed onto a stand or platform. In another embodiment, the main body may be placed or otherwise temporarly inserted onto or into a stand or platform. The main body may be attached to a lanyard in order for it to be hung around a user's neck or on a peg.

In one embodiment, as shown in FIG. 1*a-c*, the main body 100 may comprise a top 110 attached to a shaft 112, with the shaft attached to a base 114. One end 116 of the shaft is attached approximately to the center of the top 118 and the other end 120 of the shaft is at least circumferentially surrounded by the base.

The main body may feature an underside 122, which is exposed to the shaft and base. The underside may feature one or more projections 124 that project orthogonally from an approximate plane of the top. The projections may have a flat portion, one or more substantially concave portions, and/or one or more substantially convex portions. The substantially convex portions are configured to at least partial receive and engage with the tips of human figures and to be gripped thereby.

The projections may be diposed at regular intervals in degrees around the center. The projections may appear every 10, 15, 20, 30, 40, 45, 50, 60, 70, 75, 80, 90, 100, 115, 120, 130, 140, 145, 150, 160, 170, or 180 degrees. The projections may also be disposed at multiple distances away from the center. The projections may appear within approximately 1, 2, 3, 4, 5, 6, 7, or 8 cms from the center. By arranging multiple projections in this manner, it will be simple for the user to access the projections regardless of the circumferential or radial position of a projection vis-a-vis a given finger. The projections may extend 1, 2, 3, 4, 5, 6, 7, 8, or more cms from the top.

The projections may be of fixed shape, or compressible in order to reduce the overall thickness of the rotational main body. The projections may be compressed by means of a series of interlocking shapes where the size of each shape is smaller than its adjacent outer shape. Alternatively, the projections may be spring-loaded or hingedly attached to the top.

The top may feature a mounting mechanism for mounting the display surface onto the top. The mounting mechanism may feature adhesive, grip, vice, bracket, hinge, or screw and nut fastening components. A top surface cross section of the top may have the same width and length as the display surface, or it may be smaller, or larger. The top surface cross section of the top is preferably rectangular, but it may also be substantially circular, polygonal, cross-shaped, or star-shaped.

As shown in FIG. 3*a-d*, the top 300 may feature a sleeve 302 into which the display surface 304 may be inserted. This sleeve is open on one or more sides 306 and preferably has a transparent face 308 for permitting the display surface to be viewed without being physically touched. The sleeve opening may be sealable to prevent the display surface from slipping out.

In one embodiment, the top is rotationally attached to the shaft and the shaft is fixedly attached to the base. The top may be circumferentially rotatable around the shaft, or it may be spherically rotatable, with the point of spherical rotation centering on a bulb disposed on the top of the shaft such that the top and shaft engage like a ball and socket. It is also conceivable for the top to comprise the ball and for the shaft to comprise the socket. Rotation between the top and the shaft may be impeded by high-friction texture, locking positions, or extreme similarity in the size and shape of the portions of the top and the shaft that interact, such that the portion of the top that engages with the portion of the shaft tightly squeezes or is squeezed by the portion of the shaft, thus requiring a user or other source to overcome a threshhold force in order to rotate the top.

In another embodiment, the top is fixedly attached to the shaft and the shaft is rotationally attached to the base. In one variation of this embodiment, the shaft and base may be inversely and interactively threaded, such that rotational movement of the base vis-a-vis the shaft enables the base to travel up the shaft axis toward the top. In this variation, the shaft and base may include a terminus projection, such that movement along the shaft axis is impeded. The terminus projection may be embedded in or extend from the shaft, and may engage with a receiving introjection inside the base, the collision of which prevents further movement. Alternatively, the terminus projection is embedded in the base and engages with a receiving introjection inside the shaft. In another variation, threading on the shaft or base is not coterminous with the full length of the shaft or base. In yet another variation of this embodiment, the base sits on a track surrounding a single segment of the shaft axis, such that the base may be spun around the track without moving up or down the shaft.

In one embodiment, a first end of the shaft is permanently fixed to an underside of the top. The shaft is rotationally coupled to the base, which fits around the second end of the shaft. The rotational coupling may be enabled by a dual sleeve construction, in which an inner sleeve conforms or attaches to the second end of the shaft and the outer sleeve surrounds and is rotationally independent from inner first sleeve. A set of ballbearings may be disposed between the inner and outer sleeves in order to fascilitate rotation. One or more middle sleeves may operate as intermediaries between the ball bearings and the inner or outer sleeves in order to better contain the ball bearrings, which may be greased in order to lubricate rotation.

The main body may feature a mechanism for the automatic rotation of the top vis-a-vis the base. The mechanism may comprise a spring, which inclines the base toward or away from the top and may be impeded by means of a lock or released therefrom. Once the mechanism is actuated, the base may rotate around, up, and toward the main body. Alternatively, the mechanism may comprise a motor, which mechanically engages the shaft or annular ring and may be electrically actuated by a pressing, flipping, squeezing, or rotating of an actuator. This actuator may be or integrated with the base.

Figure 4:
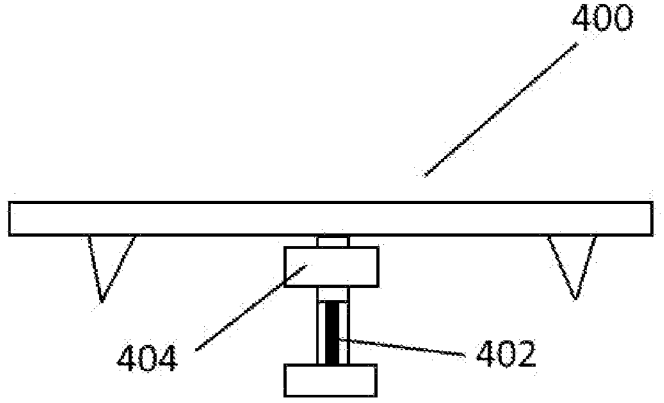
FIG. 4 shows an exemplary device equipped with a motor and motion detector.

As shown in FIG. 4, the main body 400 may feature a motion detector 402 electrically connected to the motor 404, enabling the user to rotate the display surface without touching it or the main body. A processor for processing the gestures may act as an intermediary between the motion detector and the motor, enabling a distinction to be made between hand gestures such that a first set of gestures will cause the motor to rotate clockwise while a second set of gestures will cause the motor to rotate counter-clockwise.

The motor may operate via magnets, including electrically activated magnets. The controller may be fixed to the main body or base, or may comprise a remote.

As shown in FIG. 5*a-f*, the shaft may be an annular ring 500. In particular, the main body 502 may be rotationally connected to the base 504 via the snap-fit annular ring, with matching snap-fit modules 506, 508 disposed on the main body and the base. The snap-fit modules may comprise rings of projections extending orthogonally from the main body and the base. The tips of the projections may comprise grips, with the grips extending at least slightly from the projections at an angle between 0 and 180 degrees from the projections themselves. These projections may engage with and the grips may at least partially wrap around the annular ring. The annular ring may have an outer surface 510 and an inner surface 512, in which case one ring of snap-fit modules may be an inner ring to engage with the inner surface of the annular ring and one ring of snap-fit modules may be an outer ring to engage with the outer surface of the annular ring. Engagement here means an attachment resulting from the mutual application of forces between the snap-fit modules, the projections, and/or the grip tips and a surface of the annular ring. The application of force must be sufficient to prevent disengagement, i.e., separation thereof, while permitting rotation. The ring of projections may feature repeating gaps such that one projection is not directly connected to another, or incompletely connected, so that a degree of independence of movement is provided between projections. This degree of independence allows the outer ring of projections to stretch or extend outward in order to receive the outer surface of the annular ring and then revert back inward in order to fix the annular ring. Conversely, the degree of independence may permit the inner ring of projections to extend inward in order to squeeze through the inner surface of the annular ring and then revert outward to fix the annular ring. In one variation, the annular ring is permanently fixed to the main body or the base, in which case it may only have either an inner or outer surface to engage with, respectively, an inner ring or outer ring of projections.

Figure 5A:
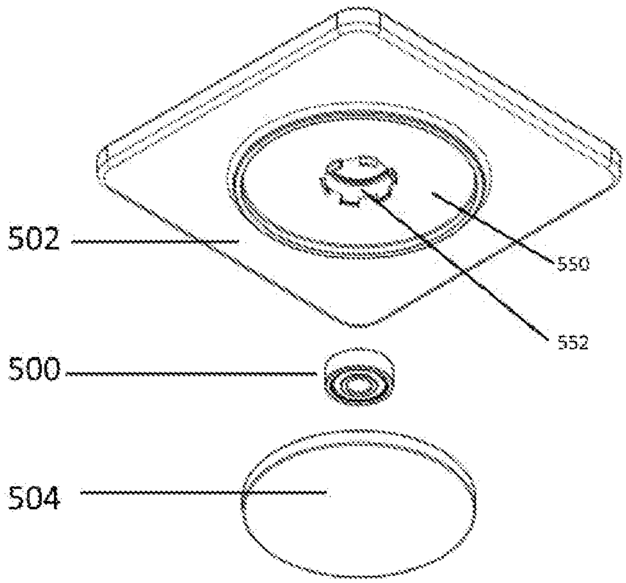
FIGS. 5*a-d* show an exemplary device with an annular ring in an expanded view, with FIG. 5*d* being a cross-sectional view.
Figure 5B:
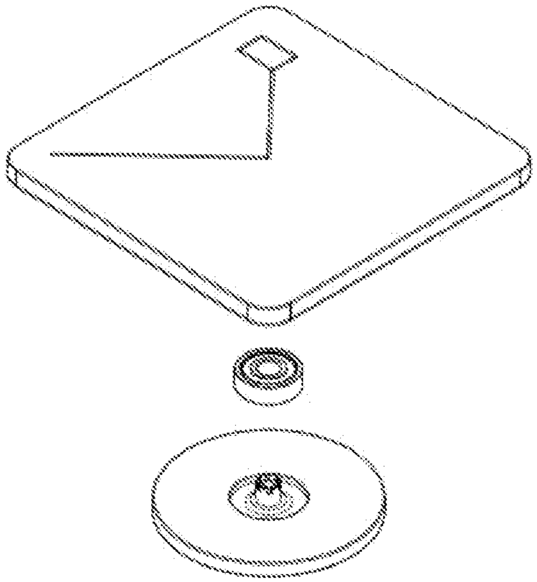
Figure 5C:
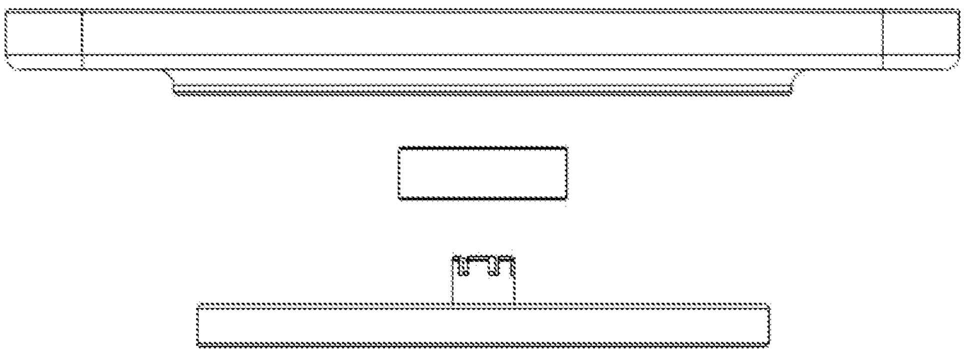
Figure 5D:
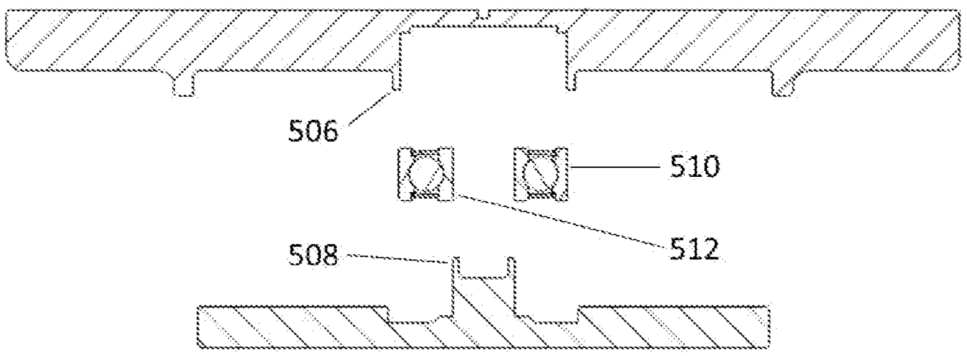
Figure 5E:
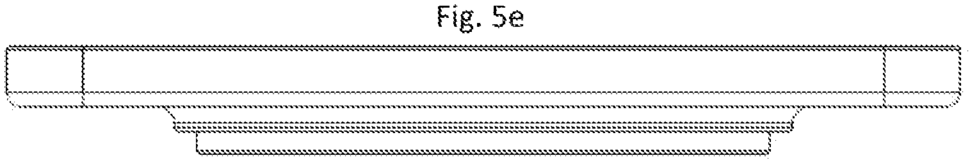
FIGS. 5*e-f* shown an exemplary device with an annular ring in a compact view with FIG. 5*f* being in a cross-sectional view.
Figure 5F:
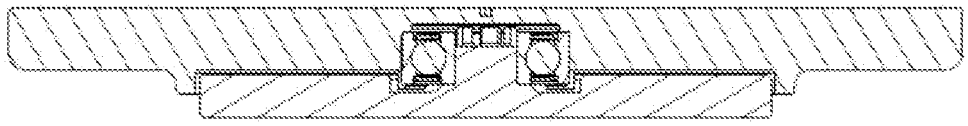

As shown in FIGS. 5*a-b*, the underside may comprise a recess 550. This recess may be substantially the same size or greater than the base, allowing the base to be disposed in the underside for more convenient storage and to reduce the overall thickness of the main body. The recess may be shaped like the base, or may comprise a shape that is more encompassing than the base—for instance, if the base is polygonal, the recess may be circular, with the diameter of the circular shape being equal to or greater than the longest diameter of the polygonal base. In one version, the recess has at least one side gap permitting a finger to enter the recess in order to move, preferably by spinning, the base out of the recess and down the shaft or annular ring. The underside may comprise a secondary recess 552 sharing the same center as the primary recess and configured to receive the annular ring.

Figure 6A:
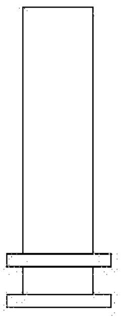
FIGS. 6*a-c* show exemplary shafts.
Figure 6B:
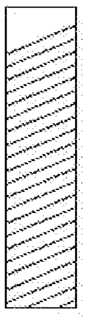
Figure 6C:
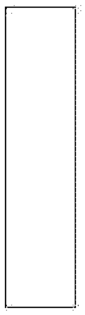
Figure 6D:
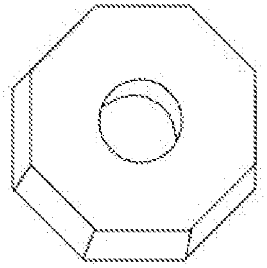
FIGS. 6*d-f* show exemplary bases.
Figure 6E:
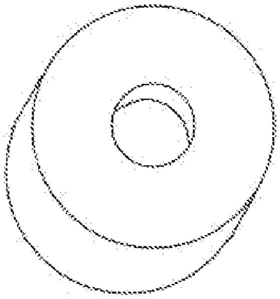
Figure 6F:
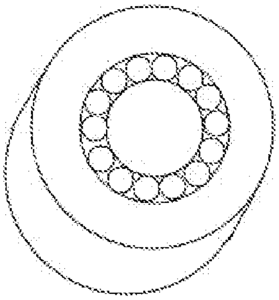
Figure 6G:
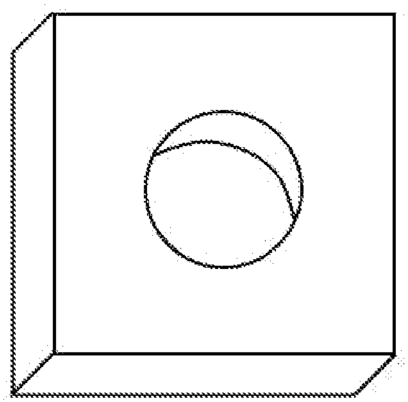
FIGS. 6*g-h* show exemplary top recesses.
Figure 6H:
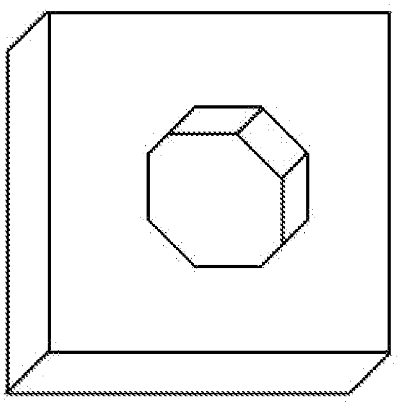

The shaft may feature a track, as shown in FIG. 6*a*, threads, as shown in FIG. 6*b*, or smooth, as shown in FIG. 6*c*. The base may be polygonal, as shown in FIG. 6*d*, disc-like, as shown in FIG. 6*e*, or feature ball bearings to facilitate rotation, as shown in FIG. 6*f*. The recess may be disc-like, as shown in FIG. 6*g*, or polygonal, as shown in FIG. 6*g*.

Figure 7A:
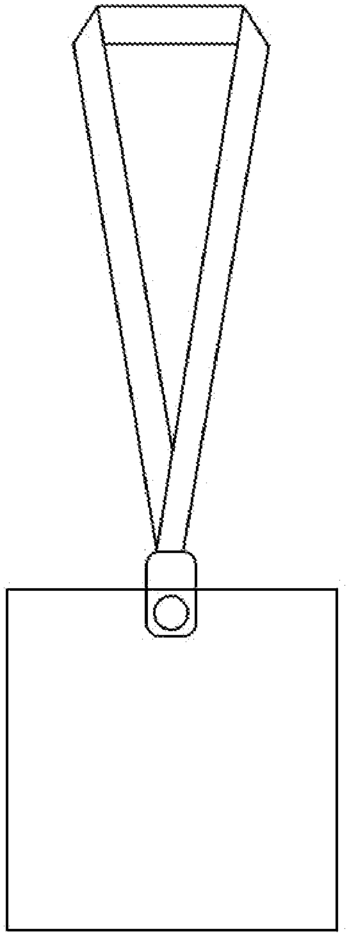
FIGS. 7*a-b* show an exemplary device with a lanyard attachment.
Figure 7B:
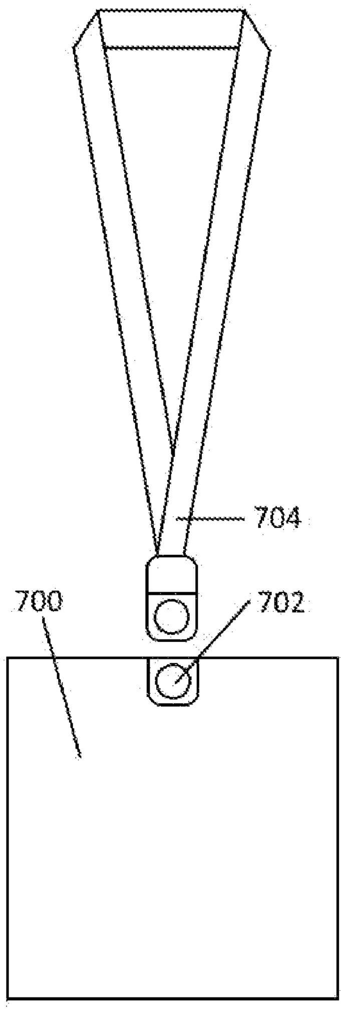

As shown in FIGS. 7*a-b*, the main body 700 may feature a connecting mechanism 702 which enables it to be attached or attachable to a lanyard 704. The connecting mechanism may comprise a carbiner, joint, snap-fit button, spring-loaded grip, or other connecting means. The main body may be inserted into a lanyard pendant frame, with the pendant frame providing at least one opening for the main body to be inserted and another side or face permitting the main body to be viewed and/or activated. The lanyard pendant frame amy comprise a bottom opening permitting the base to extend outward from the main body and to provide access to actuation of the base vis-a-vis the main body when the main body is inside the lanyard pendant frame. The pendant frame may connect to the lanyard by any of the connecting mechanisms referred to previously. The lanyard itself may be made of cloth, cord, fiber, string, or other flexible strand-shaped material.

The base may have a shaft-facing inner surface and a user-facing outer surface.

The base inner surface may be grooved, threaded, smooth, or otherwise configured to interact with the shaft. Similarly, the shaft outer surface may be grooved, threaded, smooth, or otherwise configured to interact with the base. The cross sections of the shaft outer surface and base inner surface are preferably substantially circular, and while the average diameter of the base is greater than the average diameter of the shaft, portions of the shaft may have a larger diameter than portions of the base. This relationship prevents the base from slipping off the shaft entirely and yet enables it to remain at a particular height along the shaft, depending on actions by the user. In one version, the average diameter of the shaft is less than lmm smaller than the average diameter of the base. In another version, the average diameter of the shaft is 1-2 mm smaller than the average diameter of the base. The average shaft diameter may be between 1-2 mm, 2-3 mm, 3-5 mm, 5-7 mm, 7-9 mm, 9-11 mm. The shaft length, from top to bottom, may be approximately 5 mm, 10 mm, 15 mm, 20 mm, 25 mm, 30 mm, 35 mm, 40 mm, 45 mm, 50 mm, 55 mm, or 60 mm. In one embodiment, the shaft may be between 6 and 10 cm. In another embodiment, the shaft may be greater than 10 cm.

The outer surface of the base will have an average or approximate diameter greater than the average or approximate diameter of the inner surface of the base. The outer surface may be substantially circular, or polygonal, and may comprise grooves, flat portions, ridges, or other surface irregularities or textures configured to provide a better grip for the user. The base may be continuous from a top side to a bottom side, or it may be tiered. The bottom tier may be conical, pyrimidal, or in another shape in pnwhich the diameter decreases as the cross section layer approaches the bottom. The base outer surface may have an average diameter 1, 2, 3, 4, 5, 6, 7, 8, 9, 10, 11, 12, 13, 14, 15, 16, 17, 18, 19, 20, or more than 20 mm greater than the inner surface average diameter.

In a preferred embodiment, the base is held between one finger and a thumb while a second finger stretches out and up toward the projections, but in an alternative embodiment, one or more gaps may be disposed between the base outer and inner surfaces, allowing a finger to be inserted therein to access the projections, such that the inserted finger is within a space bounded by the first finger and the thumb.

In one embodiment, a data communication chip may be embedded in the main body. Specifically, the data communication chip may be embedded in the top, the annular ring or shaft, or the base. The data communication chip may be accessed by a smart device via a wireless protocol, such as bluetooth, WiFi, or NFC (near-field communications).

The data communication chip may contain additional information associated with the AR marker, such as contextual descriptions in readable text, meta-data such as format and file data relating to the an AR file associated with the AR marker, data relating to the AR design surface such as the date of creation or the most recent update date, or data relating to the physical device itself, such as the date of manufacture, the date of purchase, or information about the user or owner of the device, such as account information. In one embodiment, the data communication chip is configured not only to be read but also to write data to itself. Such data may include the number of times it has been accessed or the identities of the devices which accessed it. The data communication chip may also be integrated into a payment system, such that a user is automatically charged based on access.

To assist the data communication chip in these various tasks, it may be connected to a processor capable of generic digitial operations. The data communication chip and processor may connected to a digital display embedded in the main body to enable the visual communication of messages to users without requiring the users to look at their own (smart) display devices.

Figure 8:
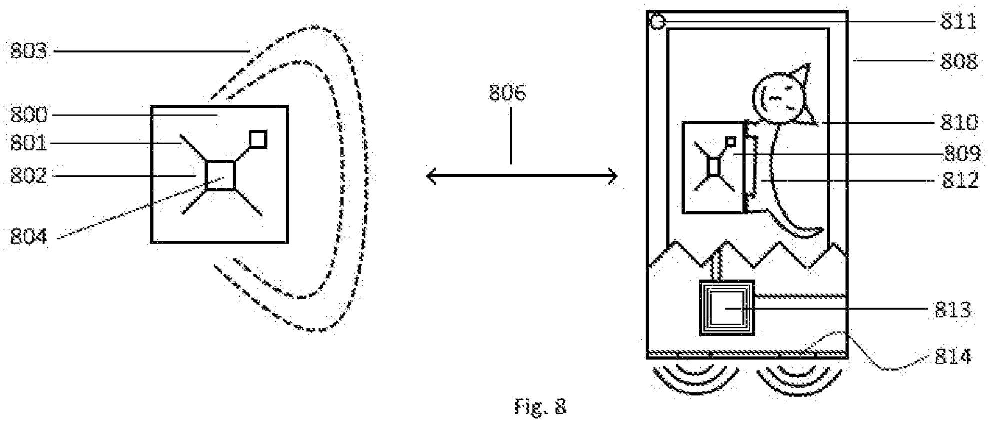
FIG. 8 shows an exemplary system comprising an NFC device and an NFC reader.
Figure 9:
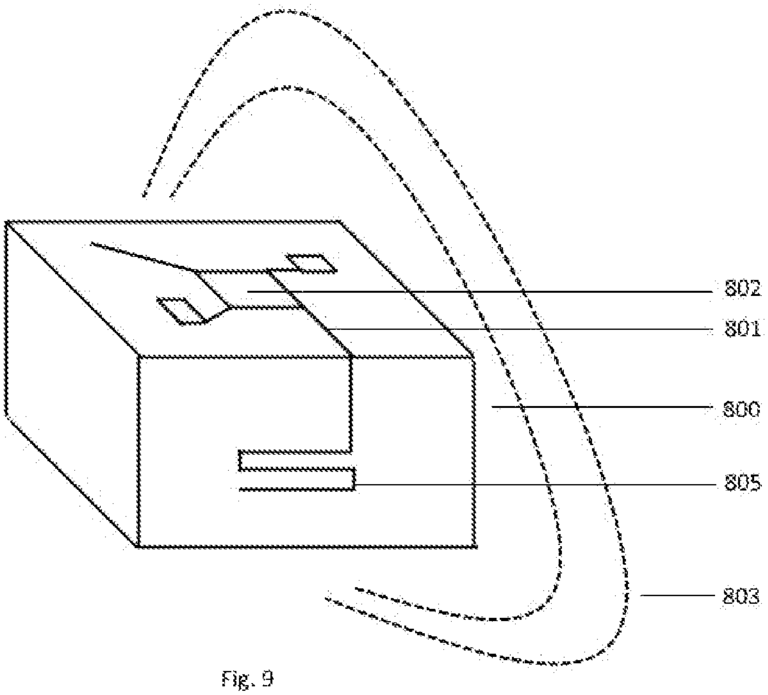
FIG. 9 shows an exemplary NFC structure comprising an NFC chip and appendages, and sidedness.

In one embodiment, as shown in FIG. 8-9, the presently described device (from hereon, the "Device") 800 features NFC (Near-Field Communication) technology for enabling a remote device 808, to detect and receive 806 data regarding the the proximity, location, orientation, and configuration of the Device in space. The remote device may be a mobile device such as a smart phone or tablet, AR or VR glasses/goggles, or any generally portable and/or handheld device which features a processor 813 and graphical and/or audio output elements, such as display screens 810 and/or speakers 814.

The NFC technology conceived here may include one or more NFC chips 802 or tags (from hereon, "NFC chips", with the NFC chips featuring one or more wires or other appendages 801 with detectable electromagnetic signatures 803 (which generally includes both electrical field and magnetic field signatures, but as used here, may include just electrical field or just magnetic field signatures). These NFC chips may be embedded or otherwise attached to one or more portions of the Device, such as the top, the main body, and/or the base. Thus, based on the relative positioning of the NFC chips and/or their appendages, the remote device may detect, first, the proximity of the Device, second, the orientation of the Device with respect to the relative positioning of the top, main body, base, one or more sides, etc., and third, the configuration of the Device, such as changes to the relative positioning of the top with respect to the base, or more generically, one part with respect to another part. In addition, the mere detection of an NFC chip and/or its appendages, regardless of proximity, orientation, or configuration, may be utilized for the various purposes described below. From hereon, the NFC chip and/or their appendages will be referred to as an "NEC Structure" 804. Altogether, the data parameters corresponding to the presence, proximity, orientation, and configuration of the Device may be referred to as "NFC Spatial Parameters".

Since the NFC structure may change as described above and as will be described below, the electromagnetic signature also changes—thus, the NFC structure changes can be detected by detecting changes in the electromagnetic signatures. Indeed, the signatures communicate to an NFC reader device the current state of the NFC structure. Thus, the signatures communicate the NFC Spatial Parameters.

NFC chips may include Single-interface NFC chips, passive NFC chips, Dual-interface NFC chips, dynamic NFC chips, NFC readers, NFC tags, or NFC controller chips. NFC appendages may include wires or any other materials that form, alter, or extend the magnetic fields produced by the NFC chips.

It is conceivable that alternative wireless protocols capable of producing readable data communication via electromagnetic fields (including radio, microwaves, infrared, visible light, ultraviolet light, X-rays, and gamma rays) may yield similar results, and thus the NFC device can be generalized to "wireless device" or "electromagnetic field producing device" ("EM device"), the NFC structure can be generalized to "wireless structure" or "electromagnetic field producing structure" ("EM structure") and the NFC spatial parameters can be generalized to simply "device parameters" or "electromagnetic field parameters" ("EM parameters"). The remote device configured to read the wireless device or EM device may be referred to as an EM reader. As used here, electromagnetic field refers to fields comprising of both electrical and magnetic fields, just electrical fields, or just magnetic fields.

Alternative wireless structures or components which may be embedded or otherwise attached to one or more portions of the Device include RFID (Radio Frequency Identification), BLE (Bluetooth Low-Energy, or Beacons), QR Codes, WiFi, Zigbee, Z-Wave, LiFi, Ultrasonic, and/or Chirpcast.

The NFC chip may feature sidedness—i.e., the chip may have a plurality of sides, with the relative positioning of the sides providing the same orientation and configuration information as the NFC chip and its appendages. Sidedness may also be captured by the positioning of the appendages relative to the chip. The appendages may be on the same plane as the NFC chip or may extend upward or downward and along the sides 805 of the Device. As described above, chips may use alternatives to NFC, and the NFC chip may thus be generalized to "EM chip".

Figure 10A:
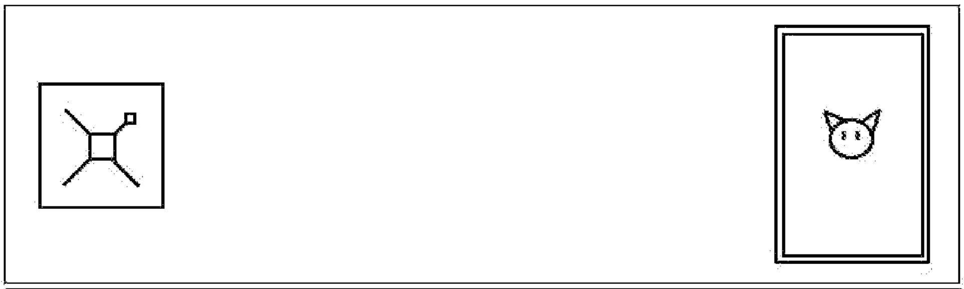
FIGS. 10*a-c* show exemplary changes in proximity of the NFC device and exemplary resultant changes in the sizing property of graphical effects on a display device.
Figure 10B:
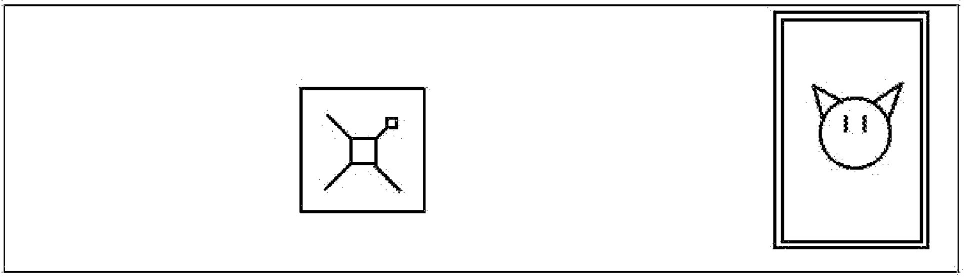
Figure 10C:
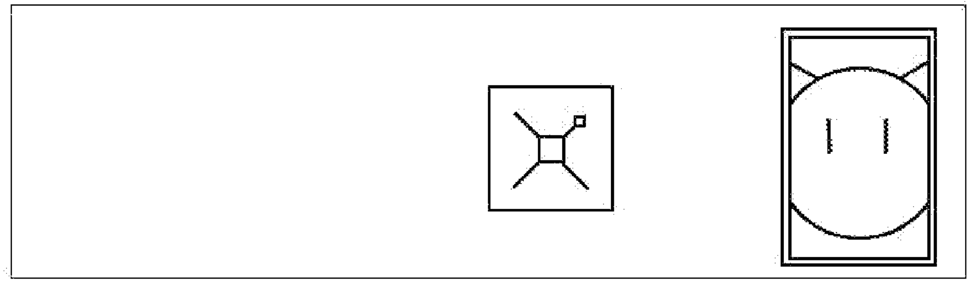
Figure 11A:
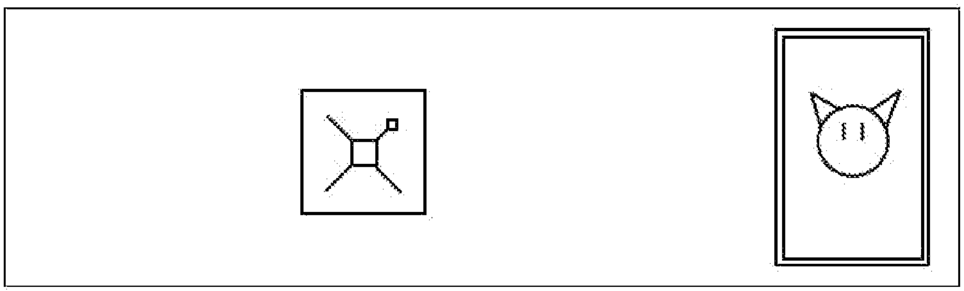
FIGS. 11*a-c* show exemplary changes in orientation of the NFC device and exemplary resultant changes in the perspective property of graphical effects on a display device.
Figure 11B:
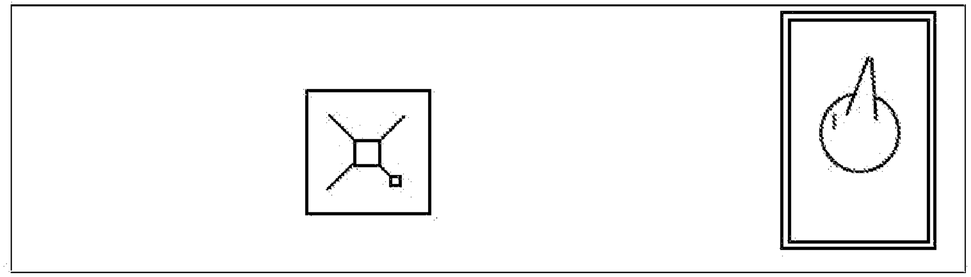
Figure 11C:
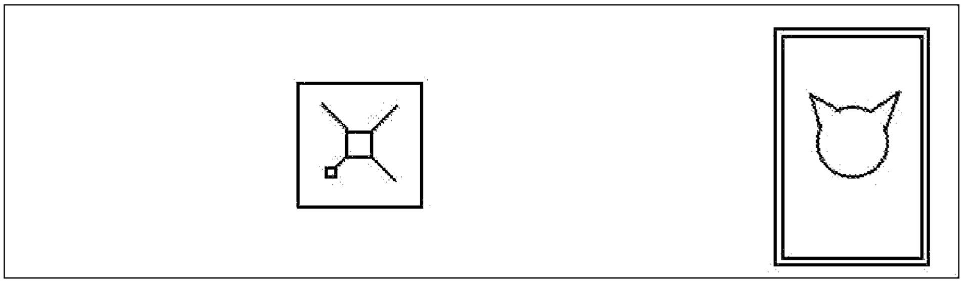

As shown in FIG. 8, the remote device may display, on a viewfinder 810, the Device 809 as captured by a camera 811, and may implement various graphical effects 812 in the viewfinder (or audio effects in the sound channel) based on the NFC Spatial Parameters. As shown in FIGS. 10*a*-10*c*, the graphical effects may differ in their apparent size based on the proximity of the Device to the mobile device, such that if the Device is further away, the apparent size of the graphical effects may be smaller and the audio effects may be decreased in volume. The changes to the effects may occur in real time as the mobile device and the Device are separated further. As shown in FIGS. 11*a*-11*c*, the perspective of the effects may also change depending on the direction from which the mobile device is detecting the Device. Thus, the mobile device may display a first side of a graphical effect if the mobile device is closest to a first side of the Device, and display a second side of a graphical effect if the mobile device is closest to a second side. Similarly, since audio effects may have directionality (i.e., changes in volume, panning from a left to right speaker, etc.), the audio effects will also change based on which side of the Device the mobile device is closest to.

The effects, both graphical and audio, may be applied to or give the illusion of emanating from a graphical or object or "asset".

The orientation of the device, the detection of which depends on the relative positioning of the NFC Structure relative to, for example, the remote device, may trigger various graphical and audio effects. Orientation is different from proximity in that it forms not merely the distance between the NFC structure and the remote device, but also the sidedness of the NF structure in spatial relation to the remote device. Two Devices may have the same proximity to a remote device, but may differ in their orientation if one has its back facing the remote device while the other has its front facing the remote device. Orientation may take into account the orientation of the sides as well, with the top and bottom of a given side differing. Thus, two Devices may have different orientations even if they have the same side facing the remote device if in one the top of the Device is above the bottom with respect to gravity while in the other the bottom of the Device is above the top with respect to gravity. As previously shown in FIGS. 11*a*-11*c*, effects may be dependent on the orientation with respect to the sidedness. As an illustrative example, if the mobile device detects that the Device is in a standard orientation, with the top above the base relative to gravity, then no effect may be triggered at all; but if the Device is detected as upside down, then an effect may "spill out" in the form of graphical and audio effects.

Figure 12A:
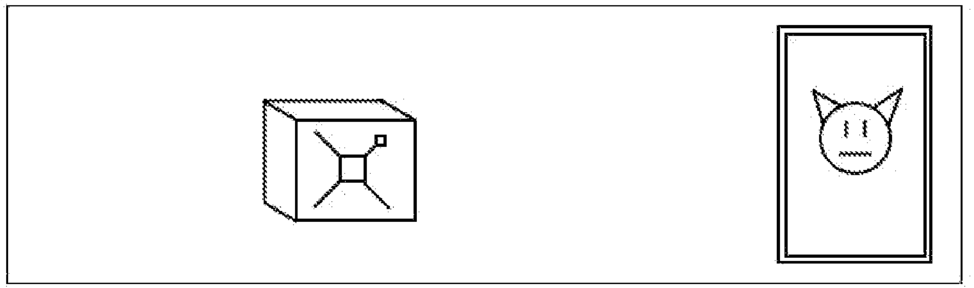
FIGS. 12*a-c* show exemplary changes in configuration of the NFC device and exemplary resultant changes in the occurrence property of graphical effects on a display device.
Figure 12B:
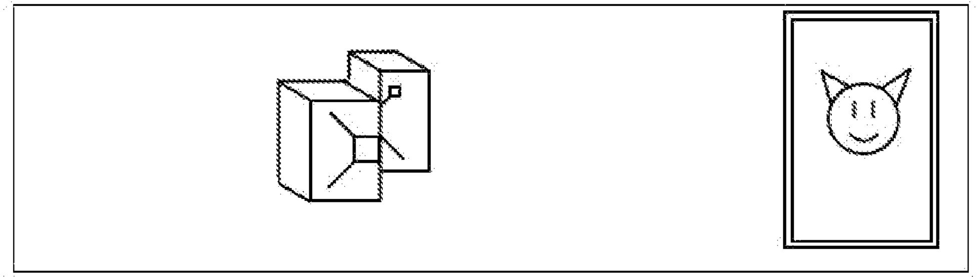
Figure 12C:
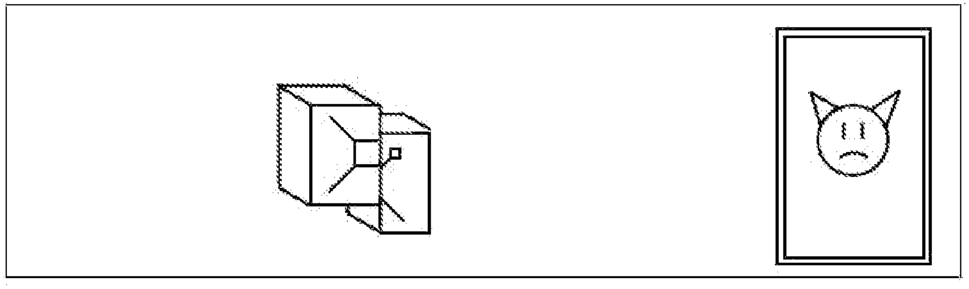

As shown in FIGS. 12*a*-12*c*, the configuration of the device, as detected based on the relative positioning of the NFC Structure, may similarly trigger various graphical and audio effects. Configuration, as a parameter, differs from orientation in that orientation corresponds to the overall positioning of the Device in real space, whereas configuration corresponds to mechanical changes to the Device itself. For example, one configuration may be the top and base both embedded in the main body, whereas a second configuration may be the top elevated above the body. Manipulations of parts of the Device may be achieved by means of mechanical elements and the manipulations thereof, such as, though not limited to, hinges, threading, annular rings, locking mechanisms, folding, bending, breaking, opening, closing, sliding, etc. In one variation, a part of the Device may actually be physically removed from the main body, the detection of which may occur through the detection of physically separate NFC chips, the separation of an NFC chip from one or more appendages, or the very absence of a particular NFC chip.

Figure 13A:
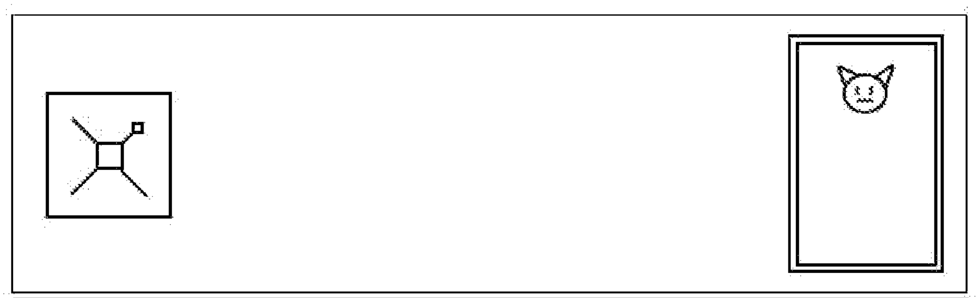
FIGS. 13*a-c* show the addition of multiple NFC devices and exemplary resultant changes in the unlocking of platform access.
Figure 13B:
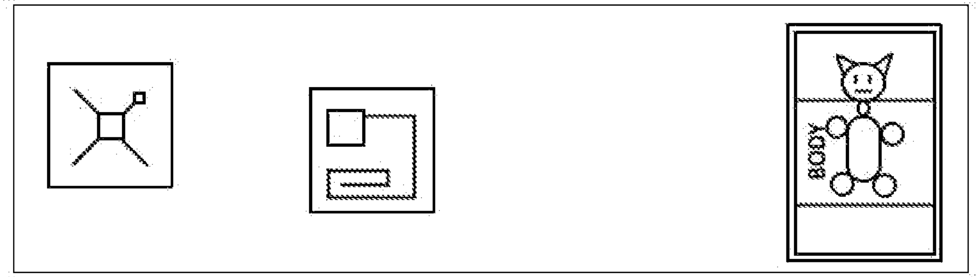
Figure 13C:
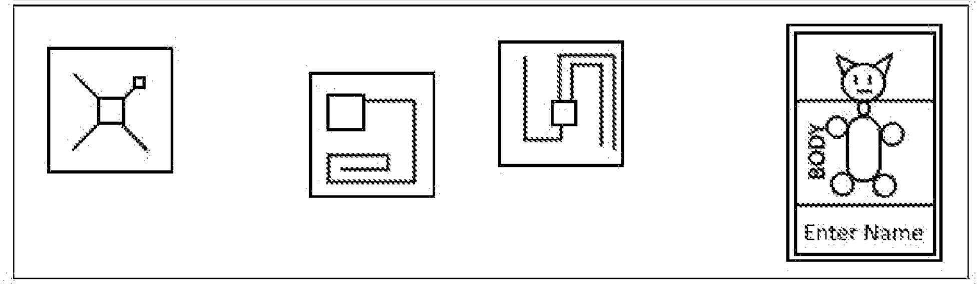

As shown in FIGS. 13*a*-13*c*, effects are triggered not merely by the NFC Spatial Parameters of a single Device, but may require or be altered by the detection of the NFC Spatial Parameters, (particularly at least initially, the presence parameter) of additional Devices.

Effects may be triggered also by an identity of the Device, as communicated by a unique NFC Structure signature. Using these identity signatures, each Device can be distinguished.

As previously shown in FIGS. 13*a*-13*c*, the detection of additional Devices, and/or the detection of a particular Device based on its identity signature, may enable the unlocking of additional content or controls. Thus, as an example, the detection of a first device may enable the manipulation of effects as applied to or otherwise emanating from a first graphical object, the detection of a second device may enable the manipulation of effects for a modification of the first graphical object, or a second graphical object altogether. As an additional example, the detection of a first device may enable manipulation of a first set of effects, such as movement along a plane, while the detection of a second device may enable manipulation of a second set of effects, such as movement in or out of the plane.

In one embodiment, the Device may be equipped with one or more sensors, such as impact, pressure, temperature, doppler, gyroscopic, sound wave, cameras, or light sensors. The Device may be specifically equipped with sensors configured to capture hand and body gestures, either via remote detection thereof or as wearables. The data received by these sensors may trigger and or modify effects of their own, but they may also modify effects responsive to changes in the NFC Spatial Parameters. Accordingly, from hereon, changes detected by the Device sensors, changes detected in the NFC Spatial Parameters, or the detection of a particular identity signature, will all be referred to as "Device Parameters".

The effects may be responsive to threshold changes in Device Parameters in addition to magnitude. A given effect may require a given threshold of a change to be triggered, but increases in or a continuance of the change beyond that threshold may have no effect. One particular species of threshold change is the very existence of any change at all, no matter the magnitude.

Effects may be triggered as a response to the mere detection of a threshold being reached, even if the triggering change in Device Parameters were to revert back to a previous state. As mentioned, the triggering of effects may depend on the detection of a sequence of changes of these parameters—and consequently, the sequence of changes may itself be considered a single "unified change". For example, the mobile device may detect a "pulse" if: a., it were brought suddenly closer to the Device, and then just as suddenly, b., returned to the previous proximity. Such a "pulse" would be distinguished from either the mobile device being jolted closer to the Device and then left to linger, or b. jolted closer to the Device and then reversed back to a starting position, but not quickly enough to be treated as a "pulse". Unified changes may be detected in reference to not just proximity and time, but in reference to other changes of Device Parameters as well.

Triggering and modification of effects in response to detecting Device Parameter changes need not be mutually exclusive. If a plurality of changes in Device Parameters were detected, effects could be triggered and/or modified for each of those changes. Thus, a first effect need not disappear after a subsequent change is detected—the first effect and the subsequent effect may exist simultaneously. The effects may also interact to create a synthesis effect. In addition, the triggering of certain effects may require the synchronicity of a sequence of various changes.

Modifications of effects may correspond to changes in the Device Parameters—thus, a spatial change of the Device may be mirrored by a spatial change of the effect. One spatial change of effect includes movement—i.e., movement of an effect in relation to either the mobile device or the Device. Carrying the mobile device to the left vis-à-vis the Device may cause the effect to move to the left, and carrying the mobile device to the right vis-à-vis the Device may cause the effect to move to the right. The same pattern may hold for vertical, rotational, or oscillatory movements as well.

It is also possible for spatial changes of the Device to trigger spatial changes of effect which do not correspond to the former but are merely triggered by it. A change in, for example, the orientation of the Device vis-à-vis the mobile device may cause the effect to move forward relative to the Device, while a reversal change in orientation may cause the effect to move backward relative to the Device.

Aspects of movement include acceleration or deceleration. Acceleration/deceleration may be triggered by a Device Parameter change. For example, while carrying the mobile device closer to the Device may trigger a forward motion of an effect, tilting the Device may accelerate the forward motion.

Effects, which may consist of animation, may progress in time to coincide with particular changes in Device Parameters. Thus, an animation may progress upon detecting a first change in a particular Device Parameter. Progress may speed up upon detecting a second change. In order for the animation to progress beyond a certain point, a change in a third Device Parameter—such as the presence of a second Device communicating a particular identity parameter. Thus, one Device may permit the viewing of the first 30 seconds of an animation, with a second Device permitting the viewing of subsequent 30 seconds, and so on. In this sense, the effect may be like a video with a set run-time but with minimal interaction.

Effects may incorporate time in a manner which provides greater interactivity as well. An object represented by an effect may appear to "age", or conversely, grow "younger". This time-related animation may not merely constitute progress through a pre-recorded track, but may function as a game object which may be additionally affected based on other game events or actions. Thus, a graphical apple, in displaying time related effects, may dehydrate, become subsumed in mold, and shrivel away, etc.—but at any point during those changes, the apple could be thrown, carried, or otherwise moved; a bite could be taken out of it or it could be cleaved; it may glow in a pulsing pattern, etc.

Figure 14A:
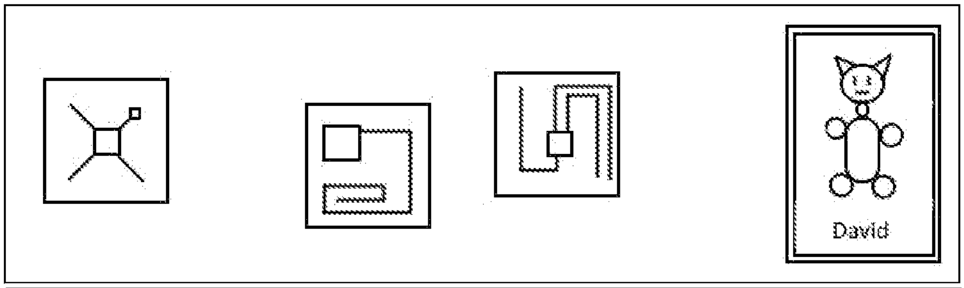
FIGS. 14*a-c* show exemplary changes in orientation of the NFC device and exemplary resultant changes in the concealing and revealing of layers of graphical effects on a display device.
Figure 14B:
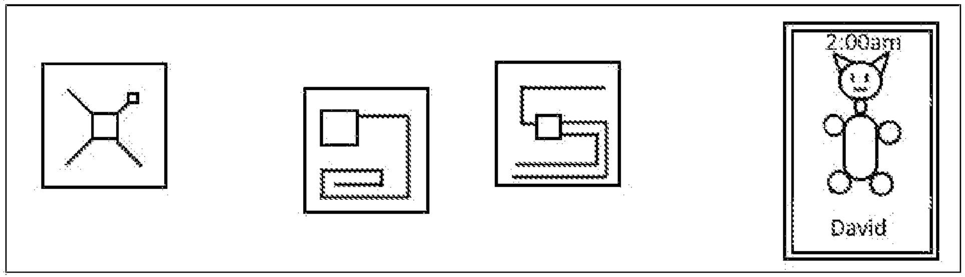
Figure 14C:
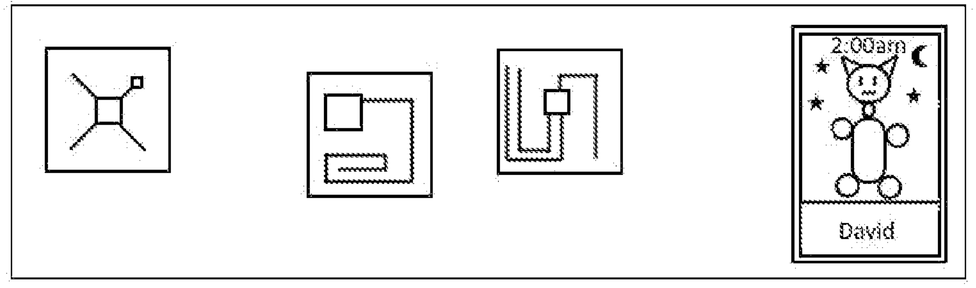
Figure 15:
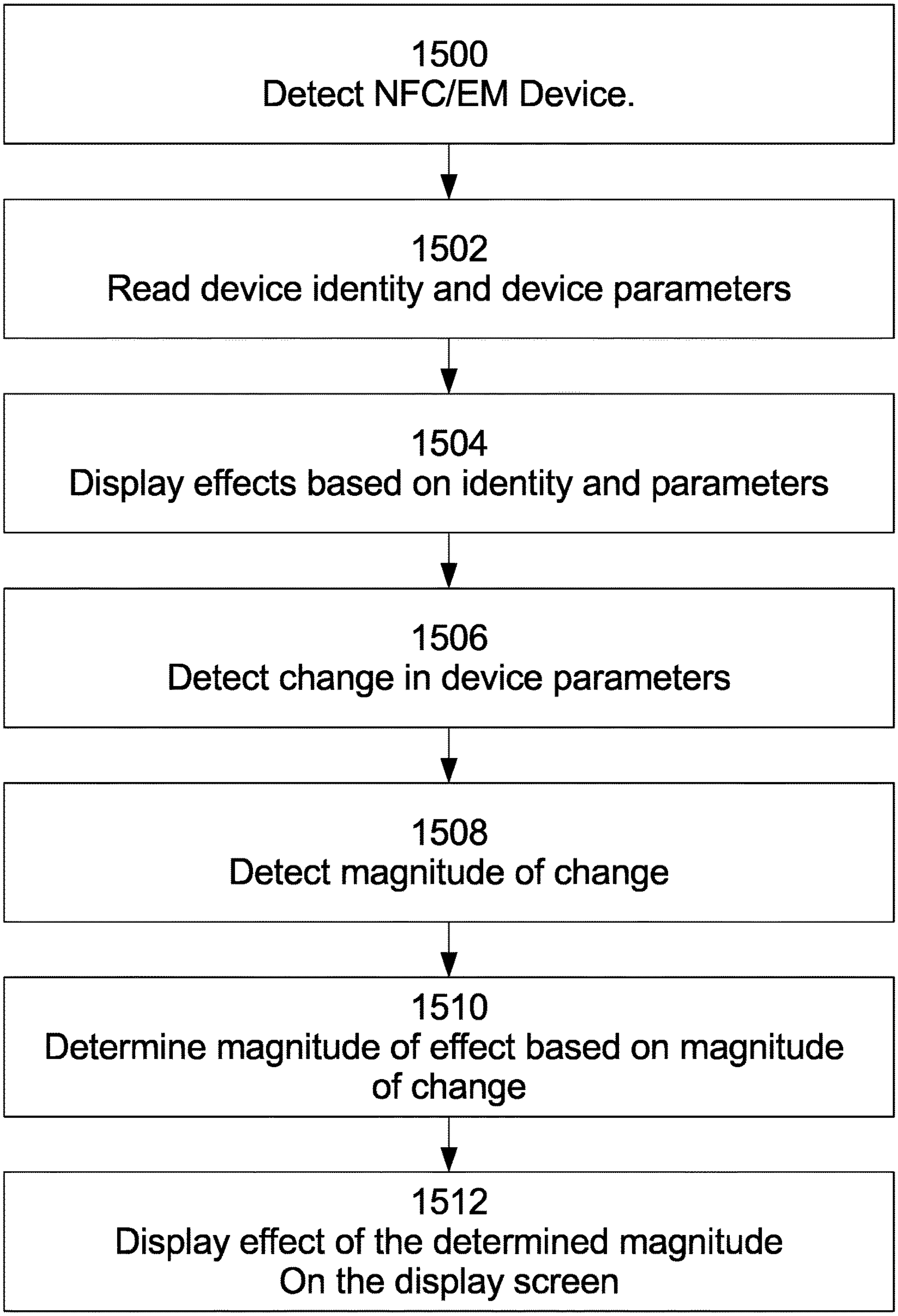
FIG. 15 is a flowchart showing an exemplary system process involving detecting the magnitude of change of a device parameter and producing a corresponding magnitude of change in a the effect.
Figure 16:
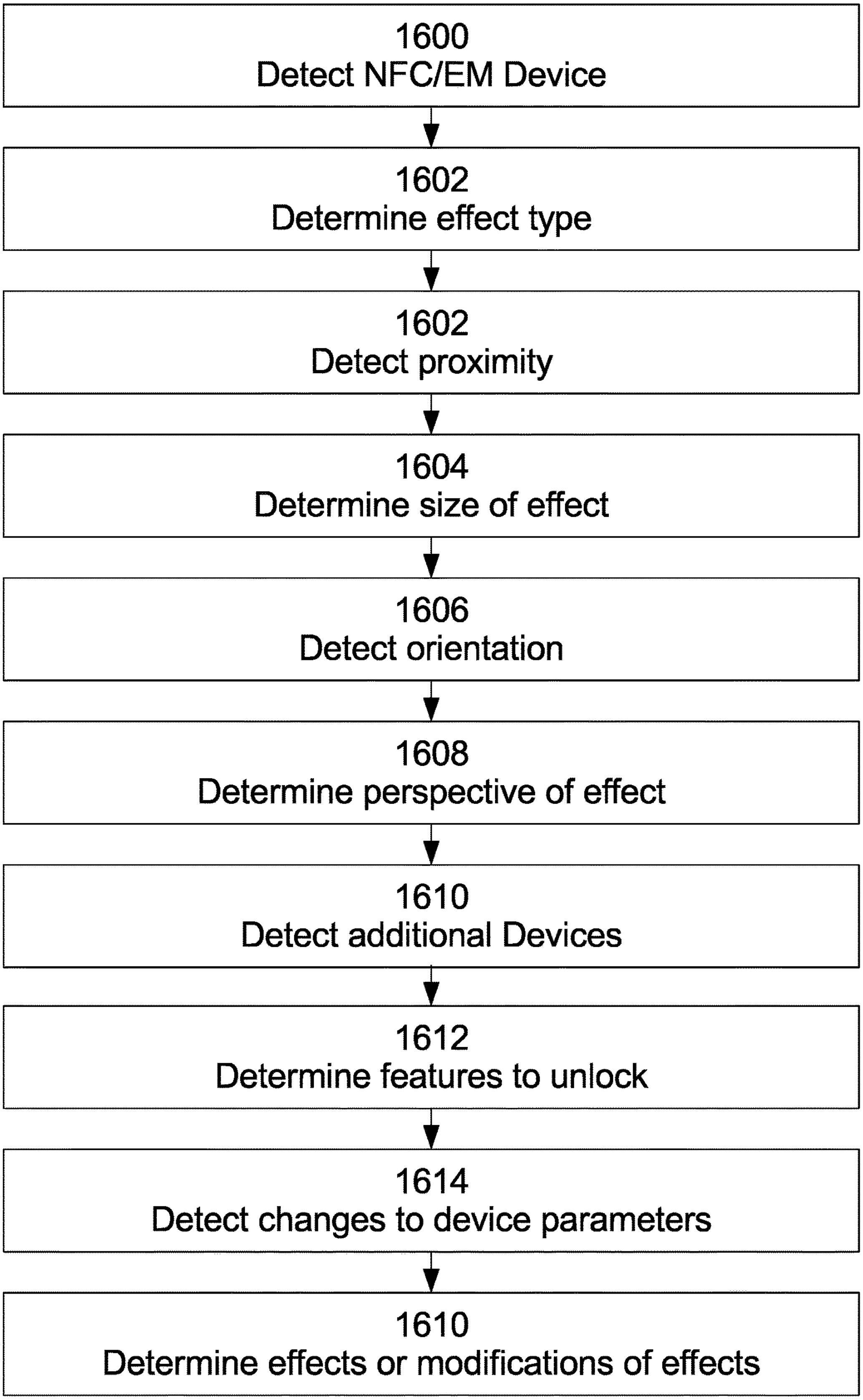
FIG. 16 is a flowchart showing an exemplary system process involving detecting the proximity, orientation, configuration, and multiplicity of devices and determining effects.
Figure 17A:
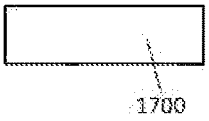
FIG. 17*a-h* shows an exemplary NFC device featuring an embedded ring.
Figure 17B:
Figure 17C:
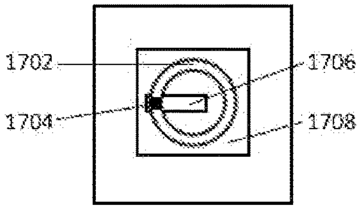
Figure 17D:
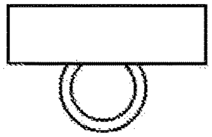
Figure 17E:
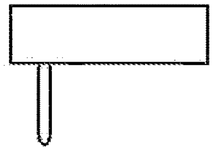
Figure 17F:
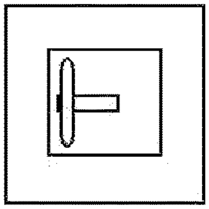
Figure 17G:
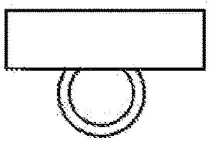
Figure 17H:
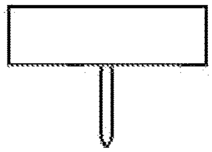
Figure 17I:
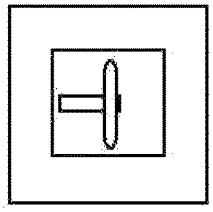
FIG. 17*i* shows a bottom view of the ring hinge moved toward the center of the track.

As shown in FIGS. 14*a*-14*c*, effects resulting from changes in Device Parameters may also pertain to concealing and/or revealing layers of a graphical (or audio) object. For example, if the Device is rotated with respect to the mobile device (or vice versa), a graphical apple may have its outer layer removed in order to provide a display of the seed carriage, or a symphony may lose or gain one or more instruments—all in real-time and based on Device Parameter changes. Control over the layer to be removed or added can be effected by changes in other Device Parameters—thus, one Device Parameter change can designate a layer, such as the graphical representation and audio track of a virtual musician, and a second Device Parameter change can add or subtract that layer.

Effects may further relate to the communication of information, such as facts or statistics pertaining to a graphical or auditory object. For example, a graphical display (of a dinosaur skull) may be triggered by the detection of the presence of a Device. Upon detecting the change of a Device Parameter, (paleontological) information may be displayed adjacent to the graphical display (of the dinosaur skull). Maintenance or a furtherance of that change may result in a graphical "scrolling" of the (paleontological) information. The detection of a separate type of change may result in the information being presented in a different way—such as the triggering of a spoken narration conveying the information via audio.

Effects may change in their visibility based on the detection of Device Parameter changes. For example, the detection of light by the light sensor may change the visibility of an effect. Such changes may exhibit correspondence, such as effects being graphically illuminated upon the detection of light, or they may be counter-intuitive, such as visibility of the effect in the absence of light, and the invisibility thereof to the degree to which light is detected.

The Device may itself include one or more lighting components, such as an array of LEDs, which enable the actual illumination of the Device. The triggering (i.e., the turning on, or off, or modulation) of the lighting components may be controlled by one or more Device Parameter changes. For example, the detection of the absence of light by the light sensor may trigger the lighting component to be turned on.

Effects may be triggered upon detecting an impact by the pressure sensor. This effect embodiment is particularly relevant if the Device functions as a projectile, such as a football, baseball, golf ball, basketball, soccer ball, frisbee, dart, arrow, etc. In a particularly pleasing effect, the detection of an impact may trigger a graphic and auditory explosion.

Effects may be triggered upon detecting hand gestures or body movements. Thus, the Device may be equipped with a camera for capturing video data and a processor for analyzed the video data to determine if one or more hand gestures or body movements of a user have occurred. Hand gestures and body movements can also be detected by detection of Device Changes of a Device held in the hands or otherwise equipped by the user conveying the hand gestures or body movements.

Effects may be triggered upon the detection of heat, or degree thereof. This effect may be useful in indicating to users what clothing to wear outside—thus, if the Device is placed or otherwise attached to a windowsill, upon the mobile device being in sufficient proximity to the Device, a graphic or audio effect will indicate whether a jacket, hat, raincoat, or pair of sandals should be worn. Heat detection may also trigger effects which correspond visually to match a perceived or amplification of climate. A graphical setting may display winter scenes when heat detection is low or absent, or beach scenes when heat detection is high. Literally corresponding effects are also conceived here: for example, a cup of water may be graphically displayed, with the state of the cup ranging from frozen to fluid corresponding to the temperature detected.

The magnitude of an effect may correspond to the magnitude of a change in a Device Parameter, as discussed. In addition, the degree of correspondence between the magnitude of an effect and the magnitude of a change in a Device Parameter may also change upon the detection of other changes in Device Parameters. Thus, a change in one Device Parameter may affect the triggering or modification of an effect triggered or modified by another Device Parameter. For example, if rotating the Device were to bring about a change in the speed of a movement, then supposing a given degree of rotation occurred at two separate distances from the Device, the rotation occurring closer to the Device may result in a greater magnitude of movement than the same rotation occurring further from the Device. By corresponding the magnitude of a first change to the magnitude of a second change in this manner, it becomes possible to more realistically model the manipulation of spatial objects.

Another example of corresponding the magnitude of a first change to the magnitude of a second change is the relationship between a detection of a change in temperature with the detection of rotation of the Device. If rotating the Device transforms a graphical object, such as water, from frozen to fluid, or vice versa, the amount of rotation necessary may depend on the temperature (or change of temperature) detected. Thus, more rotation may be required to "melt" water the temperature detected is below freezing than if the temperature is highly above freezing.

Effects may include not merely immediate graphical or auditory communications to the user, but may also constitute communications to other devices or platforms. In one example, the detection of a Device Parameter change, such as the detection of the presence of an additional Device, may be communicated to a particular platform and that communication may update, unlock or otherwise enable features that were previously inaccessible. These features may be characters in a game, actions a player can implement in the game, settings in which the player can participate, etc. The particular feature may correspond to the particular identity signature detected, and a plurality of identity signatures might be required in order to fully unlock a platform, a game mode or feature, or a platform designation of a player achievement having been reached.

In one embodiment, the Device may comprise the annular ring or hand-held or remote rotation enabling mechanisms previously described. As shown in FIGS. 17*a*-17*i*, the Device 1700 may also comprise an embedded ring 1702 and niche 1708 with a hinge 1704 and track feature 1706 to enable the ring to be removed from the niche via the hinge, and then to enable the hinged ring to slide across a track embedded in the niche. This structure may additionally comprise thumb grooves to facilitate the removal of the ring. The embedded ring and niche may be disposed on the top, main body, or base of the device. In one variation, the hinge is spring loaded and the niche is shaped to fit, apply pressure to, and receive pressure from, the ring, so that once the ring is hingedly removed, the hinge is propelled by the spring toward the center of the track. In order to be re-embedded into the niche, the hinged component may need to be pressed back against the spring.

Figure 18A:
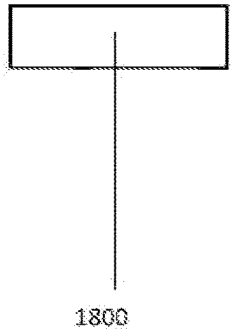
FIG. 18*a-c* shows an exemplary NFC device featuring an embedded band.
Figure 18B:
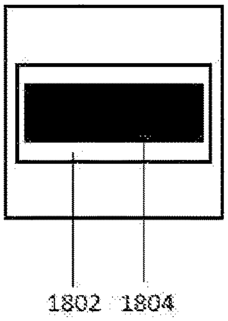
Figure 18C:
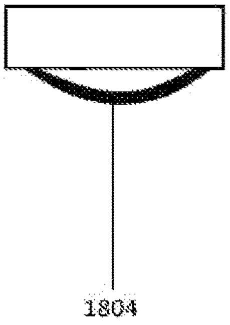

In one embodiment, as shown in FIGS. 18*a*-18*c*, the Device 1800 may comprise an embedded band 1804 and niche 1802. The niche is shaped substantially like the embedded band, with the addition of thumb grooves placed to facilitate the removal of a central portion of the band from the niche. The band is attached to the device at the ends but not attached in the center, enabling a user to slip a finger or hand underneath in order to securely grasp the Device. The band may be partly elastic and made of elastic material such as rubber. The band may have a width of 0.5-2 cm and a length of 2-4 cm in order to engage a finger, or a width of 1-4 cm and a length of 8-10 cm in order to engage a hand. The depth of the niche may be proportionate to the thickness of the band such that the band is substantially or totally embedded in the niche when not in use. In one variation, the band is attached at the ends, with the ends being fixed in their position. In another variation, the ends engage with a track contained within the niche, such that the ends of the bands can slide from the ends of the track toward the center of the track, thereby enabling the band to form a ring like shape. As before, the track may be spring loaded to enable the automatic centering of the band ends.

The invention claimed is:

1. An EM device for an augmented or virtual reality experience, comprising a main body and an electromagnetic signature;

a. with the electromagnetic signature configured to be read by an EM reader and to communicate device parameters to the EM reader;

b. with the device parameters corresponding to graphical effects configured to be displayed on a display device or audio effects configured to be played on an electroacoustic transducer;

c. with device parameters including an orientation of the EM device;

d. wherein the EM reader determines the orientation based on the electromagnetic signature;

e. with the properties of the effects dependent on the device parameters.

2. The EM device of claim 1, with the electromagnetic signature connected to or embedded in the main body and comprising a plurality of sides.

3. The EM device of claim 1, with the electromagnetic signature comprising a set of appendages.

4. The EM device of claim 3, with the set of appendages arranged throughout at least a portion of the main body.

5. The EM device of claim 1, wherein the orientation comprises a sidedness-based spatial relationship between the electromagnetic signature and the EM reader, and wherein the EM reader determines the orientation based on physical characteristics of the electromagnetic signature.

6. The EM device of claim 1, with device parameters including a proximity between the EM device and another device.

7. The EM device of claim 1, with properties of the effects being graphical effects including sizing.

8. The EM device of claim 1, with properties of the effects being graphical effects including perspective.

9. The EM device of claim 1, with properties of the effects being graphical effects including occurrence.

10. The EM device of claim 1, with properties of the effects being graphical effects including movement.

11. The EM device of claim 1, with properties of the effects being graphical effects including revealing or concealing a graphical layer.

12. The EM device of claim 1, with properties of the effects being audio effects including volume.

13. The EM device of claim 1, with properties of the effects being audio effects including panning.

14. The EM device of claim 1, with properties of the effects being audio effects including occurrence.

15. The EM device of claim 1, with properties of the effects being audio effects including revealing or concealing an audio layer.

16. The EM device of claim 1, with properties of the effects including unlocking features on a separate platform.

* * * * *